United States Patent
Droulez et al.

(10) Patent No.: US 12,040,466 B2
(45) Date of Patent: Jul. 16, 2024

(54) SYSTEM FOR COOLING AT LEAST ONE MOTOR VEHICLE BATTERY

(71) Applicant: Valeo Systemes Thermiques, Le Mesnil-Saint-Denis (FR)

(72) Inventors: Eric Droulez, Le Mesnil Saint Denis (FR); Anne-Sylvie Magnier-Cathenod, Le Mesnil Saint Denis (FR); Carlos Martins, Le Mesnil Saint Denis (FR); Victor Carvalho, Le Mesnil Saint Denis (FR); Esteban Candia, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 911 days.

(21) Appl. No.: 17/046,078

(22) PCT Filed: Apr. 5, 2019

(86) PCT No.: PCT/FR2019/050802
§ 371 (c)(1),
(2) Date: Dec. 14, 2020

(87) PCT Pub. No.: WO2019/197759
PCT Pub. Date: Oct. 17, 2019

(65) Prior Publication Data
US 2021/0098838 A1 Apr. 1, 2021

(30) Foreign Application Priority Data

Apr. 10, 2018 (FR) ...................... 1853099

(51) Int. Cl.
*H01M 10/625* (2014.01)
*B60L 58/26* (2019.01)
(Continued)

(52) U.S. Cl.
CPC .......... *H01M 10/625* (2015.04); *B60L 58/26* (2019.02); *H01M 10/0525* (2013.01);
(Continued)

(58) Field of Classification Search
CPC ................................................ H01M 2220/20
See application file for complete search history.

(56) References Cited

U.S. PATENT DOCUMENTS 8,852,772 B2 * 10/2014 McDonald .............. B60L 50/64
429/50
2009/0142653 A1 * 6/2009 Okada ................. H01M 50/209
429/120

(Continued)

FOREIGN PATENT DOCUMENTS

DE 102012220537 A1 * 5/2013 ............. B60L 11/18
FR 2976739 A3 12/2012
(Continued)

OTHER PUBLICATIONS

International Search Report and Written Opinion issued in Corresponding PCT Application No. PCT/FR2019/050802, dated Apr. 10, 2018 (5 Pages).

(Continued)

*Primary Examiner* — Scott J. Chmielecki
(74) *Attorney, Agent, or Firm* — Osha Bergman Watanabe & Burton LLP (57) ABSTRACT

The invention relates to a system (1) for cooling at least one motor vehicle battery (2), this system including:
a closed compartment (3) arranged to receive a battery or battery cells (2), a dielectric fluid (4) present in the compartment so that it is able to cool the battery, a cooling device (5) arranged to cool the dielectric fluid, this cooling device including at least one channel in which a heat transfer fluid separate from the dielectric
(Continued)

fluid can circulate, this cooling device including at least one inclined face for heat exchange between the dielectric fluid and the heat transfer fluid, this face (110) being arranged inclined relative to a horizontal direction when the system is mounted on the motor vehicle.

11 Claims, 6 Drawing Sheets

(51) Int. Cl.
*H01M 10/0525* (2010.01)
*H01M 10/613* (2014.01)
*H01M 10/6554* (2014.01)
*H01M 10/6556* (2014.01)
*H01M 10/6569* (2014.01)

(52) U.S. Cl.
CPC ..... *H01M 10/613* (2015.04); *H01M 10/6554* (2015.04); *H01M 10/6556* (2015.04); *H01M 10/6569* (2015.04); *H01M 2220/20* (2013.01)

(56) References Cited

U.S. PATENT DOCUMENTS

| | | | | |
|---|---|---|---|---|
| 2012/0003515 | A1* | 1/2012 | Eisenhour | H01M 10/6571 429/62 |
| 2013/0122331 | A1* | 5/2013 | McDonald | H01M 10/625 429/50 |
| 2013/0224540 | A1* | 8/2013 | Cha | H01M 50/209 429/83 |
| 2013/0316211 | A1* | 11/2013 | Kim | H01M 10/6557 429/99 |
| 2014/0023905 | A1* | 1/2014 | Taniyama | H01M 10/482 429/120 |
| 2017/0084884 | A1* | 3/2017 | Tononishi | H01M 50/60 |
| 2017/0179551 | A1* | 6/2017 | Shepard | H01G 11/82 |
| 2018/0145382 | A1* | 5/2018 | Harris | H01M 10/643 |
| 2019/0067760 | A1* | 2/2019 | Son | H01M 10/647 |
| 2019/0123405 | A1* | 4/2019 | Jeon | H01M 10/625 |
| 2020/0406784 | A1* | 12/2020 | Yoshida | B60L 58/26 |

FOREIGN PATENT DOCUMENTS

| | | |
|---|---|---|
| FR | 2996066 A1 | 3/2014 |
| FR | 3037727 A3 | 12/2016 |
| GB | 2546739 A | 8/2017 |
| WO | 2016/055708 A1 | 4/2016 |

OTHER PUBLICATIONS

Written Opinion Issued in corresponding PCT Application No. PCT/FR2019/050802, dated Apr. 10, 2018 (6 Pages).

Office Action issued in counterpart Chinese Patent Application CN 201980037699.X mailed Dec. 5, 2023 (75 pages).

* cited by examiner

SYSTEM FOR COOLING AT LEAST ONE MOTOR VEHICLE BATTERY

The present invention relates to a system for cooling at least one motor vehicle battery.

The invention applies in particular to all electric or hybrid motor vehicles with a battery pack and an air conditioning system, and optionally a rapid battery charging input.

Patent U.S. Pat. No. 8,852,772 describes a system for cooling a lithium-ion battery, suitable for use in a hybrid vehicle. This system comprises a plurality of stand-alone liquid cooling modules. Each cooling module comprises a plurality of battery cells having at least one fluid channel formed between them. A dielectric fluid is arranged in at least one fluid channel. The dielectric fluid is in contact with the entire battery in order to heat and/or cool the entire battery. A heating element can be arranged in the inner space, and heats the dielectric fluid. A cooling element is arranged in the inner space, and cools the dielectric fluid.

Patent applications FR3037727 and US20170179551A1 also describe a battery cooling device.

The present invention aims to improve the known systems.

The invention thus relates to a system for cooling at least one motor vehicle battery, this system including:
- a closed compartment arranged to receive a battery or battery cells,
- a dielectric fluid present in the compartment so that it is able to cool the battery,
- a cooling device arranged to cool the dielectric fluid, this cooling device including at least one channel in which a heat transfer fluid separate from the dielectric fluid can circulate, this cooling device including at least one inclined face for heat exchange between the dielectric fluid and the heat transfer fluid, this face being arranged inclined relative to a horizontal direction when the system is mounted on the motor vehicle, this inclined face being in particular just below a cover closing the compartment.

The invention advocates inclining the face of the cooling device, which is positioned inside the system, above the battery or battery cells, which are in particular immersed in the dielectric fluid.

This dielectric fluid advantageously makes it possible to cool the battery or the cells by evaporating when they heat up.

The gas then comes into contact with the cold exchanger, or an inclined face, positioned preferably level with a cover of the battery. The dielectric fluid condenses on the cold inclined face or faces of the exchanger, namely the cooling device.

The invention makes it possible to facilitate the gravity flow of the drops of dielectric fluid, as the face or faces are inclined.

In addition, this inclination promotes the passage of the gases on each side of the exchanger. Each face is thus effective.

For example, the inclined face or faces form an angle of at least 15° relative to the base of the battery or the cells.

According to one embodiment of the invention, the compartment that receives the battery or battery cells includes at least one side wall and the heat exchange face forms an angle other than 90° with this side wall.

According to one embodiment of the invention, the compartment that receives the battery or battery cells includes at least a bottom and the heat exchange face forms an angle other than 0° with this bottom, in particular an angle of between 5° and 45°, in particular an angle substantially equal to 15°.

According to one embodiment of the invention, the bottom and the side wall are substantially perpendicular.

According to one embodiment of the invention, the cooling device includes a plurality of separate inclined faces that are preferably parallel to each other.

According to one embodiment of the invention, the centers of these inclined faces are aligned on a single axis.

According to one embodiment of the invention, there is a free space between these inclined faces.

The inclined faces are thus not contiguous in order to facilitate the flow of the condensates. In addition, the free space between the cold face and the battery can be put to good use for cooling electronic components.

According to one embodiment of the invention, the inclined faces are the same sizes and/or shapes.

According to one embodiment of the invention, the distance separating these faces can be variable, in order to ensure the homogeneity of the cooling and limit temperature differences between the cells.

According to one embodiment of the invention, the inclined faces are defined on bundles of tubes in which the heat transfer fluid circulates.

According to one embodiment of the invention, at least some tubes in each bundle have a rectangular transverse cross-section.

According to one embodiment of the invention, the tubes form a single row.

According to one embodiment of the invention, the inclined faces number at least 2, or at least 5, or at least 10.

According to one embodiment of the invention, the bundles of tubes are connected to common manifolds distributing the heat transfer fluid to the bundles of tubes.

According to one embodiment of the invention, the inclined faces extend between the two manifolds.

According to one embodiment of the invention, the faces are arranged above the battery cells so that condensed liquid on the inclined face can fall by gravity onto the battery cells.

According to one embodiment of the invention, the inclined faces extend along the entire length of the heat transfer fluid flow tubes.

According to one embodiment of the invention, the inclined face or faces are planar.

According to one embodiment of the invention, a liquid guiding wall is provided to be connected to the inclined face so that it guides condensed liquid on the inclined face towards the battery cells.

According to one embodiment of the invention, this guiding wall extends substantially vertically.

This makes it possible to promote the flow in preferred cooling zones such as the connections.

According to one embodiment of the invention, there is a guiding wall on some of the inclined faces only.

According to one embodiment of the invention, the cooling device includes a plurality of separate inclined faces and each inclined face is associated with a single heat transfer fluid channel.

According to one embodiment of the invention, the channel has a substantially rectangular transverse cross-section that has a substantially cylindrical shape at the ends, at the connection to the manifold or collector box.

According to one embodiment of the invention, the inclined face or faces include protrusions.

According to one embodiment of the invention, the inclined faces are all parallel.

According to one embodiment of the invention, the inclined faces are arranged in two groups, each group being defined by a different inclination from the other group. The inclination is preferably identical for all of the faces in the same group.

According to one embodiment of the invention, the inclinations between the two groups form an angle of between 180° and 90°, in particular between 180° and 100°.

According to one embodiment of the invention, the cooling device includes at least one inclined face, in thermal contact with a heat transfer fluid circuit, it being possible for this circuit to have at least one bend, in particular at least two bends.

According to one embodiment of the invention, this inclined face is formed on a plate that defines the circuit.

According to one embodiment of the invention, the plate includes a heat transfer fluid inlet and outlet, in particular on one face of the plate, top or bottom.

According to one embodiment of the invention, the inlet or inlets of the cold plates are preferably situated substantially in the center of the battery or the cells, as this benefits less from external cooling.

The heat transfer fluid outlets can thus be further away from the center of the cells than the heat transfer fluid inlets.

According to one embodiment of the invention, the plate includes two walls, in particular stamped, assembled together.

According to one embodiment of the invention, the cooling device includes two such plates with a fluid circuit that is coiled in particular, and these plates are inclined towards the cells as they get closer to each other.

As a variant, the cooling device includes two such plates with a fluid circuit that snakes in particular, and these plates are inclined away from the cells as they get closer to each other.

According to one embodiment of the invention, the plates are spaced apart from each other, and in particular symmetrical relative to a plane of symmetry.

According to one embodiment of the invention, one of the plates extends above several battery cells, in particular half of the battery cells in the compartment.

The number of passages in the cold fluid circuit of each plate, and the width thereof, will be adjusted as a function of the morphology of the battery or the cells and the footprint due to the inclination of the cooling face or faces.

According to one embodiment of the invention, the plate is substantially rectangular.

According to one embodiment of the invention, the inclined face or faces can have corrugations in order to increase the exchange, or vertical fins.

According to one embodiment of the invention, the cooling can also take place via a coil provided with fins advantageously inclined by at least 15°.

According to one aspect of the invention, the cooling system includes:
- a closed compartment arranged to receive a battery or battery cells,
- a dielectric fluid present in the compartment so that it is able to cool the battery or battery cells,
- a cooling device arranged to cool the dielectric fluid, this cooling device including at least one channel in which a heat transfer fluid separate from the dielectric fluid can circulate, this cooling device being arranged so that it allows the cooling of the refrigerant, by a choice of, as a function of parameters, the ambient air, in particular with a radiator, or heat exchange with an air conditioning assembly of the motor vehicle.

Preferably, the battery cells are immersed in the dielectric fluid.

The cooling of the dielectric fluid can be the condensation of the fluid that has changed to the vapor phase.

According to one aspect of the invention, the cooling device is connected to a low-temperature loop that comprises a heat exchanger, in particular a radiator, in which this refrigerant can circulate, the radiator being in contact with the ambient air.

Advantageously, the radiator is arranged on a front face of the vehicle.

According to one aspect of the invention, the low-temperature loop does not include a component to be cooled upstream of the battery cooling system.

According to one aspect of the invention, the cooling device is connected to a heat exchanger, in particular a cooler or chiller, that is connected to the air conditioning assembly so that the heat transfer fluid can be cooled by heat exchange with the heat transfer fluid of the air conditioning assembly.

According to one aspect of the invention, the heat transfer fluid is a liquid, in particular glycol water.

The heat exchanges can thus be efficient, in particular compared with blown air.

According to one aspect of the invention, the battery pack compartment is essentially filled with dielectric fluid, in liquid or gaseous phase, without any substantial presence of air. The heat exchanges are carried out mainly by the dielectric fluid.

According to one aspect of the invention, the cooling device and the compartment form an integrated module, namely an assembly that can be handled as a whole, or in other words the cooling device and the compartment are not remote from each other. The heat exchanges between the cooling device and the compartment can thus be efficient and implementation can be relatively simple. Additional pipes between the cooling device and the compartment suitable for receiving the battery or batteries, or battery cells, can thus be avoided.

According to one aspect of the invention, the dielectric fluid is in contact with the battery or batteries, or battery cells.

According to one aspect of the invention, the dielectric fluid is arranged in the compartment at a negative pressure at normal temperatures (approximately 30°) and, when the battery is operating, the pressure is of the order of 0.5 bar at 20° C.

According to one aspect of the invention, the compartment does not receive any electric cooling devices housed inside it. The cooling of the dielectric fluid is carried out through the heat exchanges with the heat transfer fluid circulating in the cooling device, without using an electric cooling device housed in the compartment, as this type of device could generate excessive electricity consumption.

According to one aspect of the invention, during the operation of the vehicle, the dielectric fluid is kept at a temperature of between 20 and 35°, in particular approximately 30°. This is a satisfactory compromise between the ambient air cooling potential and the thermal stresses imposed by the battery or batteries, or the cells.

According to one aspect of the invention, the dielectric fluid is a fluid capable of changing phase during operation; in particular, the fluid has a boiling point of 30° in the pressure conditions in the compartment, in particular at 0.5 bar.

According to one aspect of the invention, the cooling device includes a condenser in contact with which dielectric fluid in gaseous phase can condense.

According to one aspect of the invention, the condenser includes a cold plate in contact with which dielectric fluid in gaseous phase can condense.

According to one aspect of the invention, the channel in which the heat transfer fluid can circulate is formed on the condenser so that it cools it. The temperature of the refrigerant, when it passes into the condenser, is preferably less than 30°.

According to one aspect of the invention, the system is arranged to cause the circulation of either in the radiator in contact with the ambient air or in the cooler connected to the air conditioning assembly of the vehicle as a function of at least one of the following parameters: the outside temperature, the temperature of the battery or batteries, the status of the vehicle represented for example by the vehicle speed, or the battery charge power.

Given the direct contact with the battery, or battery cells, and the temperature of approximately 30° at which the dielectric fluid is kept, the fluid passing through the cooling device can be provided at higher temperatures than in a conventional system (approximately 15-20° C.), for example a cold plate system, which has more thermal resistance. Cooling can therefore take place with liquid itself cooled by air up to temperatures close to 25-30° C. This makes it possible to avoid frequent use of the air conditioning assembly, which consumes energy.

The invention will be better understood and further details, features and advantages of the invention will become apparent from reading the following description given by way of non-limiting examples and with reference to the appended drawing, in which.

Figure 1:
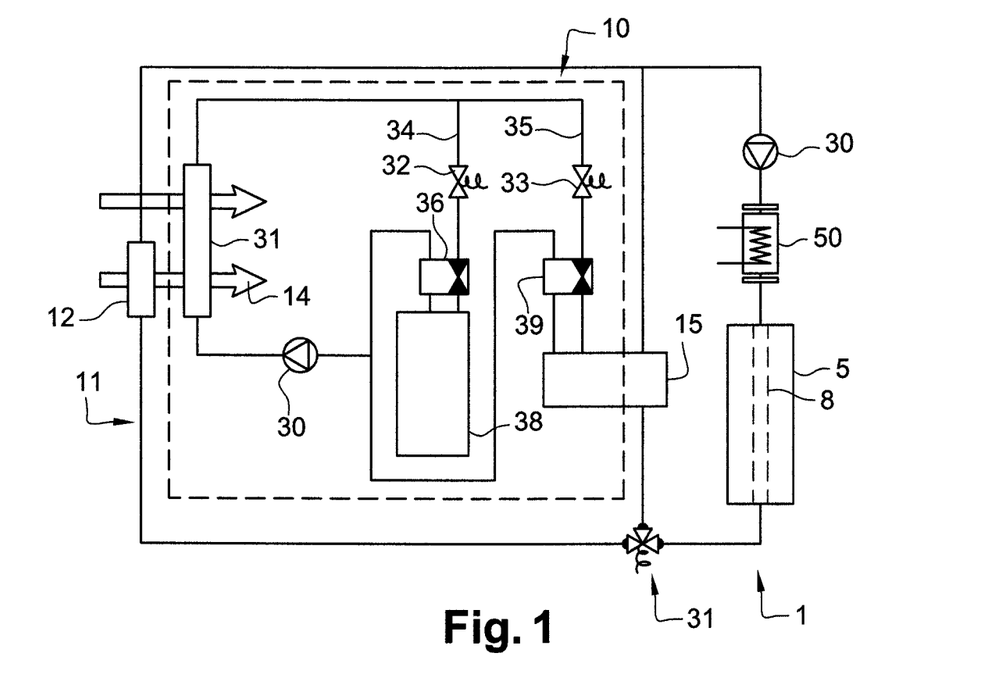
FIG. 1 schematically and partially illustrates a cooling system according to one example of the invention and its environment, FIG. 2 schematically and partially illustrates the cooling system of FIG. 1.
Figure 2:
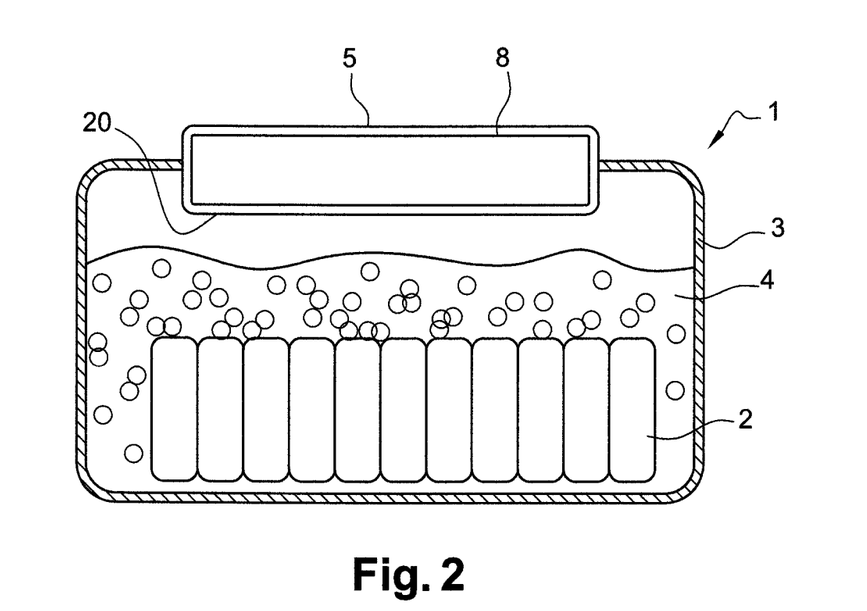

By way of example, FIGS. 1 and 2 show a system 1 for cooling a motor vehicle battery pack 2, this system including:
- a closed compartment 3 arranged to receive the battery cells 2,
- a dielectric fluid 4 present in the compartment 3 so that it is able to cool the battery cells,
- a cooling device 5 arranged to cool the dielectric fluid 3, this cooling device 5 including a channel 8 in which a heat transfer fluid separate from the dielectric fluid 4 can circulate, this cooling device 5 being arranged so that it allows the cooling of the refrigerant, by a choice of, as a function of parameters, the ambient air or heat exchange with an air conditioning assembly 10 of the motor vehicle.

The air conditioning assembly 10 can include, in a known manner, an evaporator, a condenser, a compressor, an expansion valve and valves (not shown).

The heat transfer fluid used in the air conditioning assembly 10 can be chosen from the fluids known as 134a, 1234yf, and CO2.

The battery cells 2 comprise for example a plurality of lithium-ion (Li-ion) batteries for use in a hybrid vehicle. In another embodiment, the plurality of battery cells are Li-ion batteries for use in a battery-powered electric vehicle.

The battery cells 2 can be stacked.

The battery cells 2 are completely immersed in the dielectric fluid 4.

The cooling device 5 is connected to a low-temperature loop 11 that comprises a heat exchanger, in this case a radiator 12, in which the refrigerant can circulate, the radiator being in contact with the ambient air.

The radiator 12 is arranged on the front face of the vehicle so that it can be cooled by the outside air 14 circulating in contact therewith.

In addition, the cooling device 5 is connected to a heat exchanger, in this case a cooler 15 or chiller, that is placed in the air conditioning assembly 10 so that the heat transfer fluid can be cooled by heat exchange with the radiator of the air conditioning assembly 10.

The heat transfer fluid is glycol water.

The compartment 3 can be formed to generate vertical circulation of dielectric fluid between the cells of the pack.

According to one aspect of the invention, the cooling device 5 and the compartment 3 form an integrated module, namely an assembly that can be handled as a whole, or in other words the cooling device and the compartment are not remote from each other. The heat exchanges between the cooling device and the compartment can thus be efficient and implementation can be relatively simple.

The heat transfer fluid could be of different types.

The cooling device 5 includes a condenser 20 in contact with which dielectric fluid 4 in gaseous phase can condense. The condenser 20 includes a cold plate, or several surfaces, in contact with which dielectric fluid in gaseous phase can condense.

The system 1 is arranged to cause the circulation of heat transfer fluid either in the radiator 12 in contact with the ambient air or in the cooler 15 connected to the air conditioning assembly 10 of the vehicle as a function of at least one of the following parameters: the outside temperature, the temperature of the battery or batteries, or the status of the vehicle represented for example by the vehicle speed.

A pump 30 is provided downstream of the cooling device 5 in order to circulate the heat transfer fluid in this device 5.

A three-way valve 31 is provided downstream of the cooling device 5 in order to send the refrigerant, depending on the operating mode, either to the coder 15 (or chiller) or to the low-temperature loop 11 (with a low-temperature radiator).

The air conditioning assembly 10 includes:
- a compressor 30 to compress the refrigerant,
- a condenser 31 downstream of the compressor 30 and placed in the air path 14 preferably behind the radiator 12,
- two valves 32 and 33 on two parallel branches 34 and 35 that are downstream of the condenser 31.

The branch 34 emerges into an expansion valve 36 arranged upstream of an evaporator 38.

The other branch 35 emerges into another expansion valve 39 that is arranged upstream of the cooler 15.

The two expansion valves 36 and 39 are connected to the compressor 30.

An additional element for heating the heat transfer fluid 50 is provided between the compressor 30 and the chiller 5, which can be an electric heater or a water condenser heat exchanger, for example.

When the vehicle is driving or undergoing electric charging, the system 1 makes it possible to cool the refrigerant, according to a cooling mode:

- by ambient air, using the low-temperature loop 11 and thus the radiator 12 if the ambient temperature Tamb is less than 30° (step 20),
- by heat exchange with the air conditioning assembly 10 of the motor vehicle if the ambient temperature Tamb is greater than approximately 30° (step 21). In this case, the air conditioning assembly 10 is running.

It is possible to provide for a fan of the car allowing the passage of air without driving.

In the case of a cold start, when the ambient temperature is very low, mainly in winter, the battery will normally also be at a low temperature.

Figure 3:
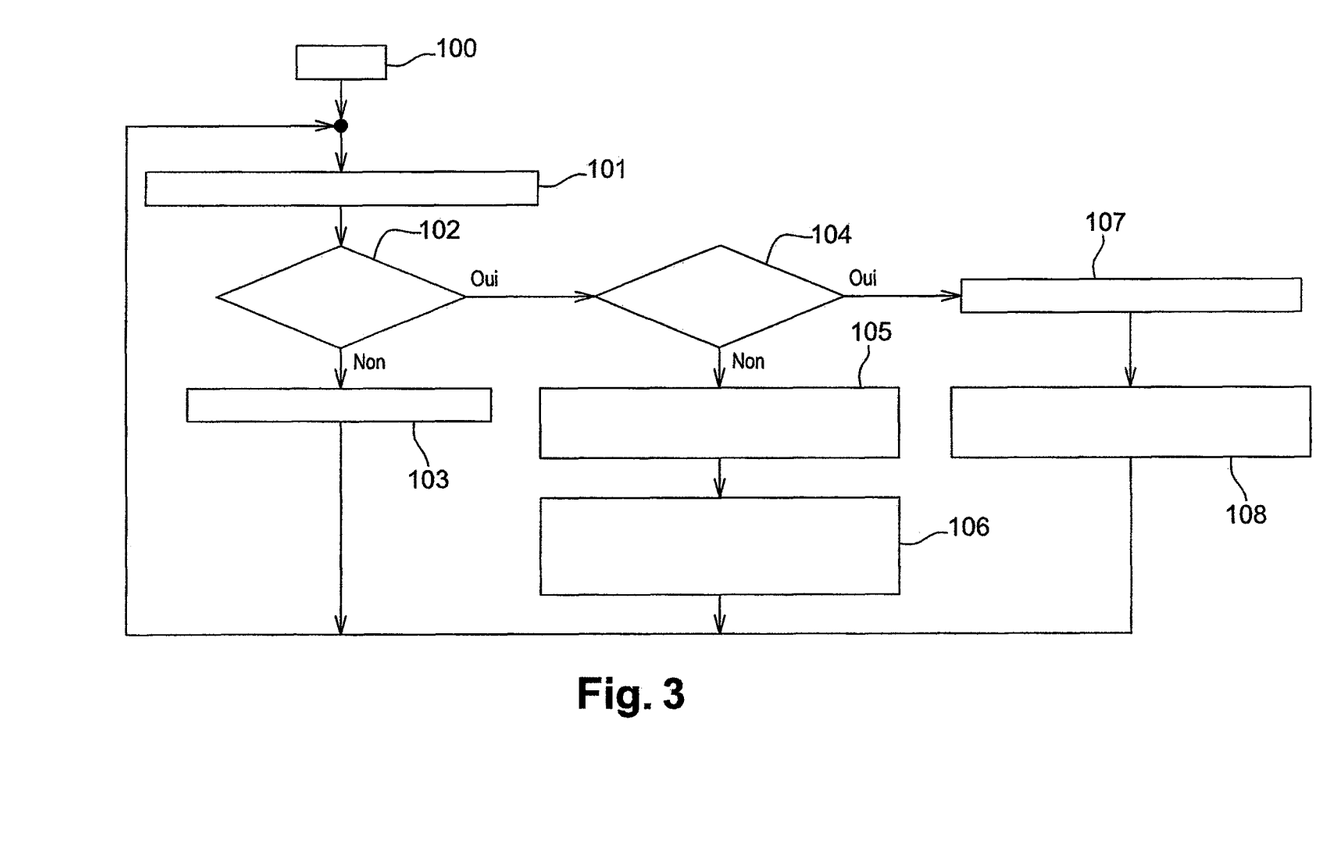
FIG. 3 illustrates the steps of the thermal management method, according to one example, FIGS. 4 to 11 schematically and partially illustrate the cooling system according to further embodiments of the invention.

By way of example, during rapid or ultra-rapid battery charging, as illustrated in FIG. 3, the invention implements the following steps, in particular to keep the battery temperature below 30°.

Step 100: start

Step 101: acquiring outside temperature and battery cell temperature data

Step 102: determining whether the cell temperature is greater than a target temperature Ttarget Step 103: if the cell temperature is not greater than Ttarget, no need for cooling Step 104: if the cell temperature is greater than Ttarget, determining whether the outside temperature is greater than a target temperature Tthreshold Step 105: if the outside temperature is not greater than Tthreshold, discharge of the heat energy to the low-temperature radiator 12

Step 106: the liquid valve is oriented to the low-temperature radiator 12 and the refrigerant valve 33 to the cooler 15 is in the closed position Step 107: if the outside temperature is greater than Tthreshold, discharge of the heat energy to the cooler 15

Step 108: the liquid valve is oriented to the cooler 15 and the refrigerant valve 33 to the cooler 15 is in the open position.

Figure 4:
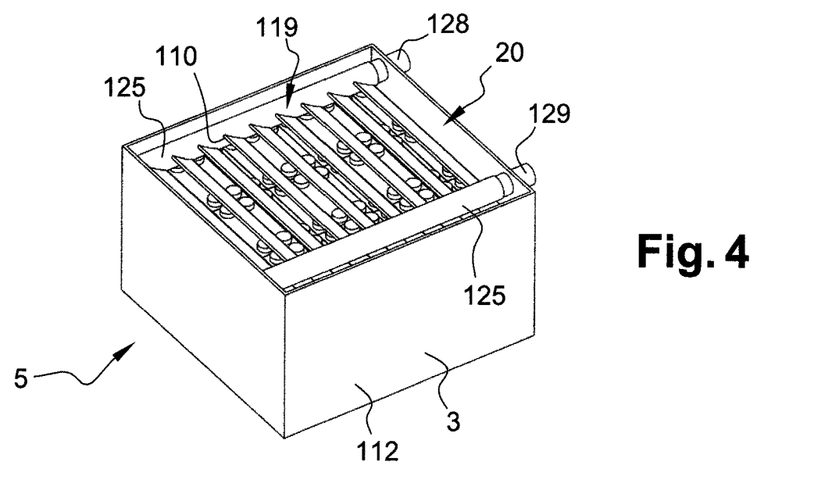
Figure 5:
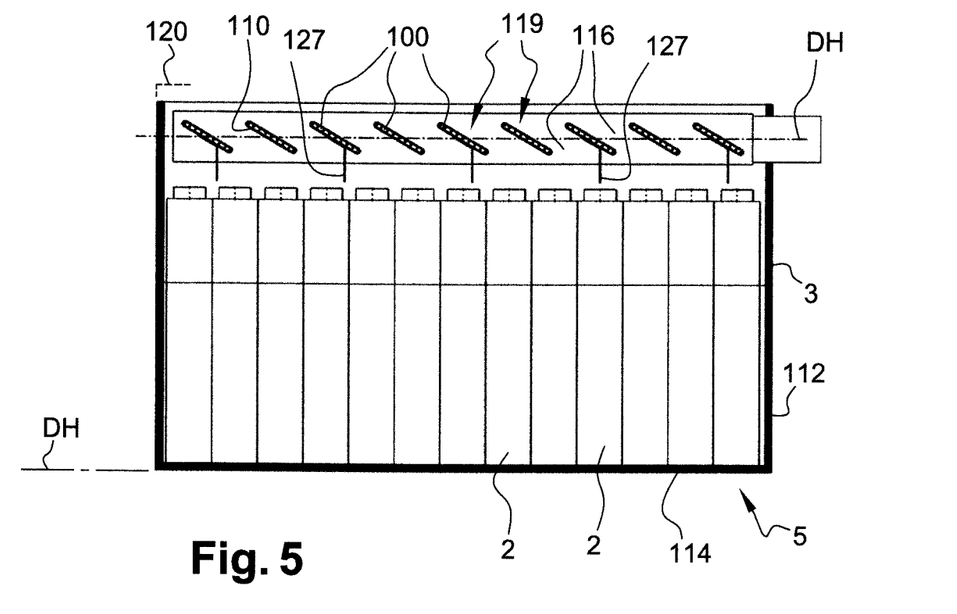

As illustrated in FIGS. 4 and 5, the cooling device 5, in particular the condenser 20, includes channels 100 in which the heat transfer fluid, separate from the dielectric fluid, can circulate.

The condenser 20 includes inclined faces 110 for heat exchange between the dielectric fluid and the heat transfer fluid.

These faces 110 are arranged inclined relative to a horizontal direction HD when the system is mounted on the motor vehicle.

These inclined faces are below a cover 120 closing the compartment 3.

The compartment 3, for example formed by a housing, which receives the battery or battery cells 2, includes side walls 112 and each heat exchange face 110 forms with this side wall 112 an angle A other than 90° or, in other words, forms with the horizontal direction HD an angle different from zero degrees, in particular an angle of between 5° and 45°, in particular an angle substantially equal to 15°.

The bottom 114 of the compartment and the side wall 112 are substantially perpendicular.

A plurality of separate inclined faces 110 parallel to each other is provided.

The centers of these inclined faces 110 are aligned on a single axis parallel to HD.

There is a free space 116 between these inclined faces.

The inclined faces are thus not contiguous in order to facilitate the flow of the condensates. In addition, the free space between the cold face and the battery can be put to good use for cooling electronic components.

The inclined faces 110 are identical.

The inclined faces 110 are defined on bundles of tubes 119 in which the heat transfer fluid circulates, and which together form the condenser.

The tubes 100 of each bundle have a rectangular transverse cross-section.

The inclined faces 110 number at least 2, or at least 5, or at least 10.

As can be seen in FIG. 5, the bundles 110 of tubes are connected to common manifolds 125 distributing, one for the fluid inlet 128 and the other for the fluid outlet 129, the heat transfer fluid to the bundles of tubes.

The inclined faces 110 extend between the two manifolds 125, perpendicularly.

The faces 110 are arranged above the battery cells 2 so that condensed liquid on the inclined face can fall by gravity onto the battery cells.

The inclined faces 110 are planar.

Liquid guiding walls 127 are provided to be connected to one of the inclined faces 110 so that they guide condensed liquid on the inclined face towards the battery cells 2.

Each guiding wall 127 extends substantially vertically.

There is a guiding wall 127 on some of the inclined faces 110 only.

Figure 6:
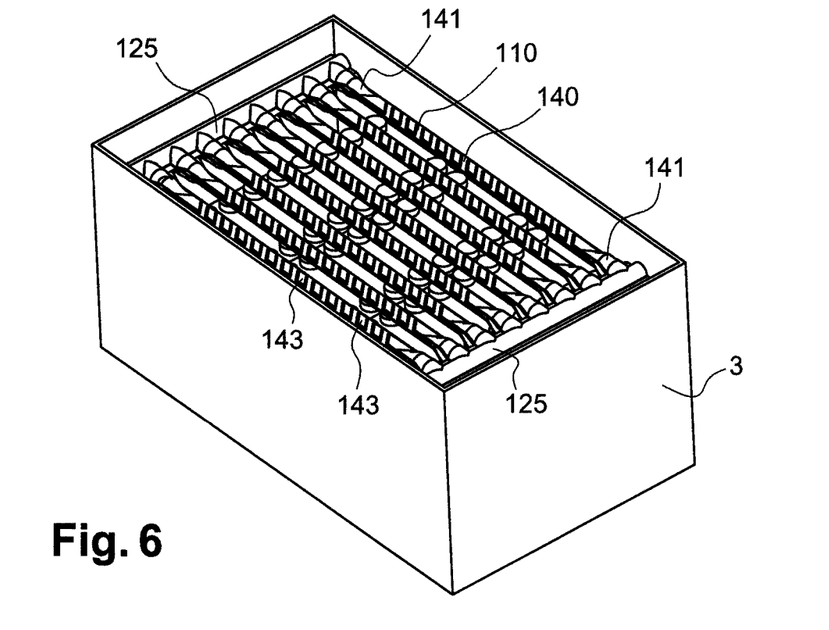
Figure 7:
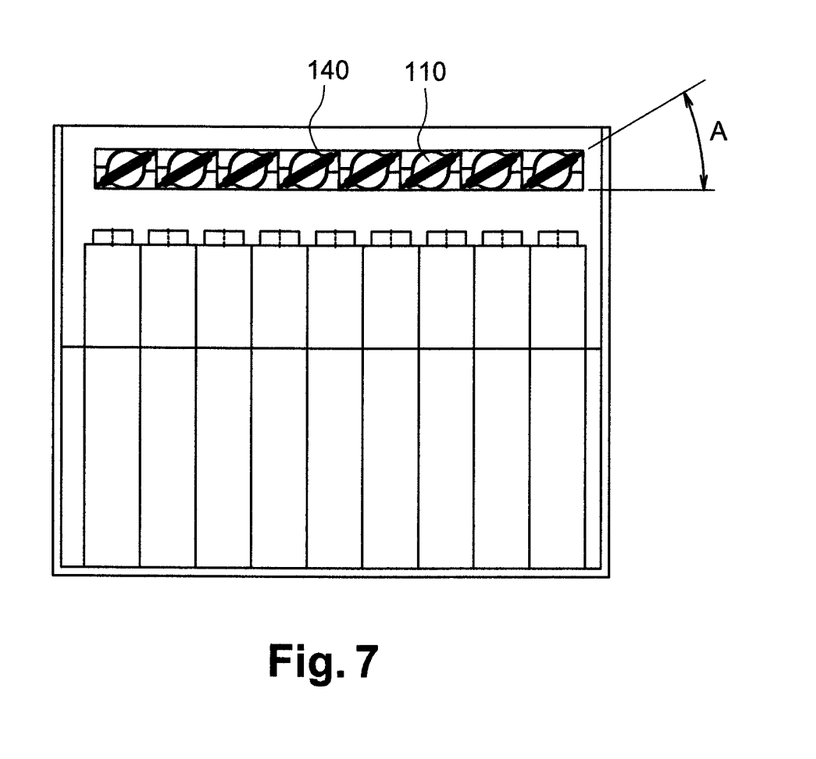

In a variant illustrated in FIGS. 6 and 7, the condenser 20 includes a plurality of separate inclined faces 110 and each inclined face is associated with a single heat transfer fluid channel 140.

The condenser 20 is for example formed by brazing two stamped plates (one lower and one upper), which is a different method from having a series of channels brazed on the two tubes (or inlet and outlet box).

The channel 140 has a substantially rectangular transverse cross-section that has a substantially cylindrical shape at the ends 141, at the connection to the manifold or collector box 125.

The inclined faces 110 include protrusions 143 or corrugations.

The inclined faces 110 are all parallel.

Figure 8:
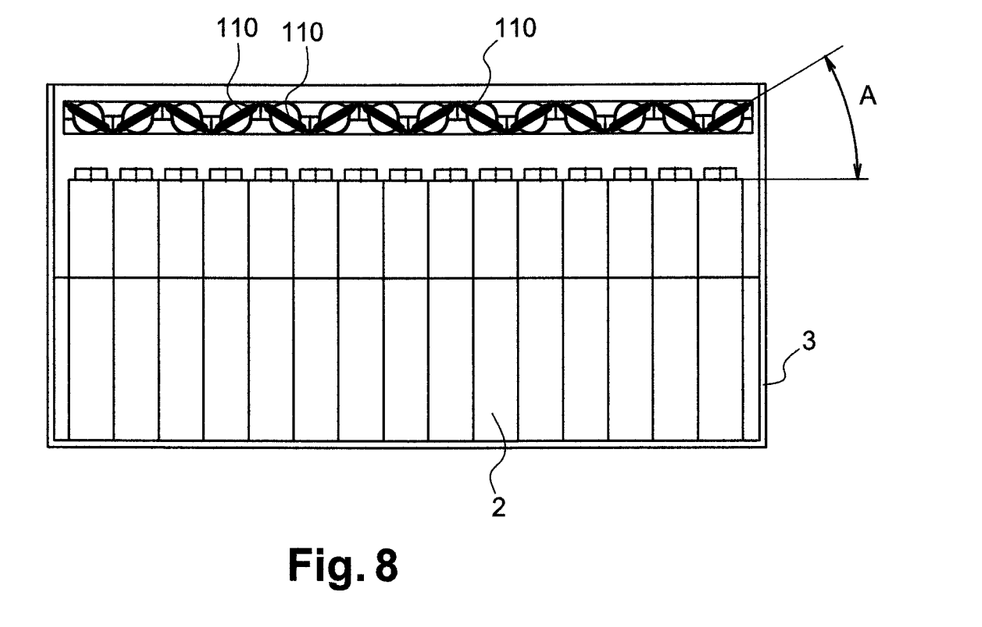

As a variant, as illustrated in FIG. 8, the inclined faces 110 are arranged in two groups, each group being defined by a different inclination from the other group. The inclination is preferably identical for all of the faces in the same group.

According to one embodiment of the invention, the inclinations between the two groups form an angle of between 180° and 90°, in particular between 180° and 100°.

Figure 9:
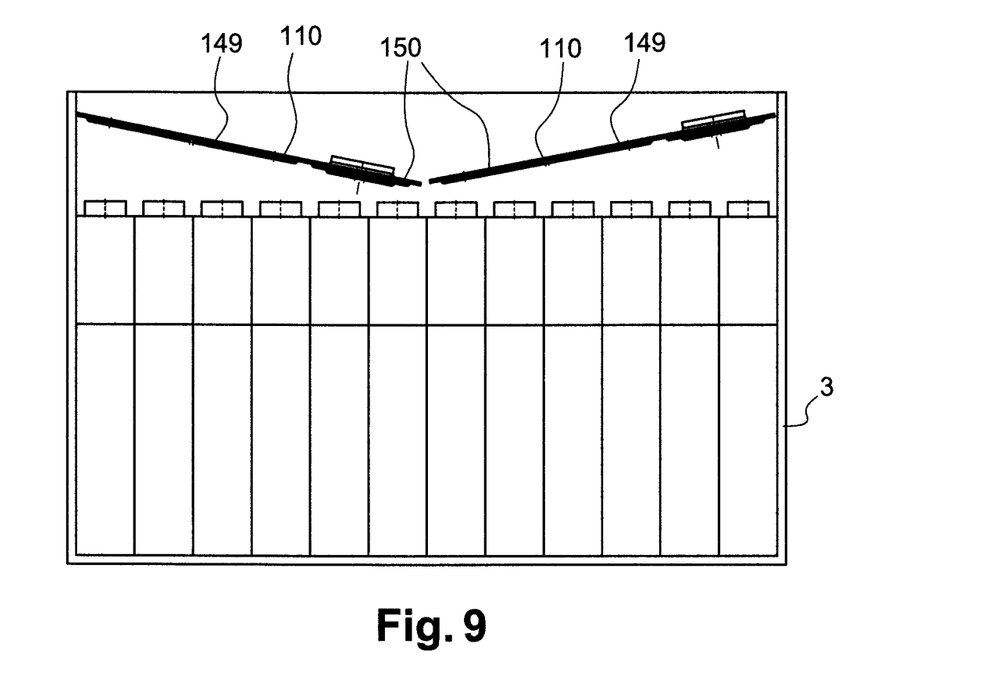
Figure 10:
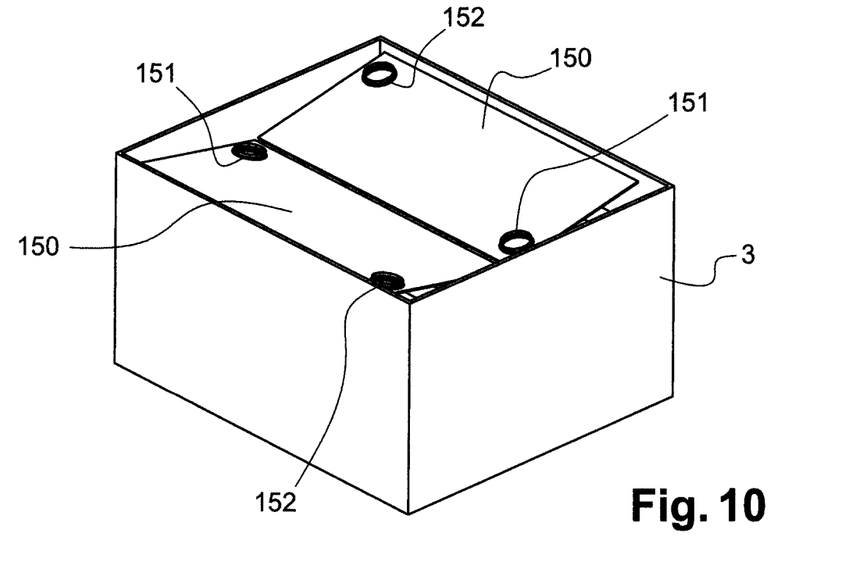

FIGS. 9 and 10 show another example of the invention, in which the condenser includes inclined faces, in thermal contact with a heat transfer fluid, it being possible for this circuit 149 to have a coiled shape.

These inclined faces 110 are formed on a plate 150 that defines the circuit 149.

Each plate 150 includes a heat transfer fluid inlet 151 and outlet 152, in particular on one face of the plate, top or bottom.

According to one embodiment of the invention, the inlet or inlets 151 of the cold plates are preferably situated in the center of the battery or the cells, as this benefits less from external cooling.

According to one embodiment of the invention, the plate 150 includes two walls, in particular stamped, assembled together.

Two such plates 150 are provided with a fluid circuit that snakes in particular, and these plates are inclined towards the cells as they get closer to each other.

The plates 150 define a V shape.

Figure 11:
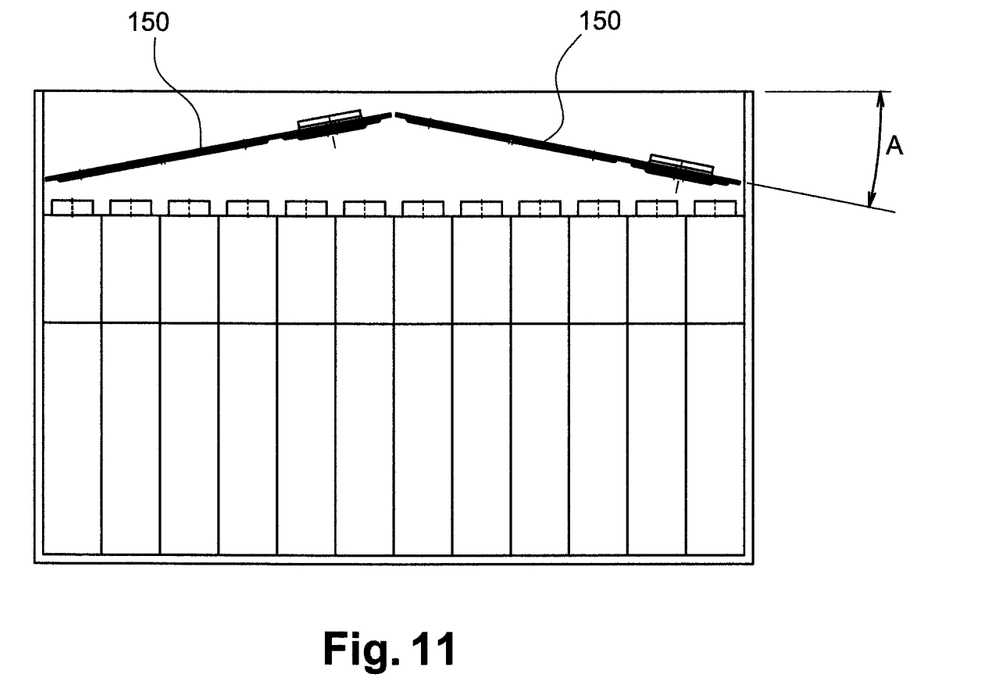

As a variant, as illustrated in FIG. 11, the cooling device includes two such plates 150 with a fluid circuit that snakes in particular, and these plates are inclined away from cells as they get closer to each other.

The plates 150 are spaced apart from each other, and in particular symmetrical relative to a plane of symmetry.

In other embodiments, it is possible to provide a series of extruded tubes brazed onto boxes or two plates stamped with the shapes of the multiple integrated channels. The shapes are for example vertical, which facilitates the return of the fluid to critical zones.

The invention claimed is:

1. A system for cooling at least one motor vehicle battery of a motor vehicle, the system comprising:
    a closed compartment arranged to receive a battery or battery cells;
    a dielectric fluid present in the compartment configured to cool the battery or battery cells,
    a cooling device arranged to cool the dielectric fluid comprising at least one channel in which a heat transfer fluid separate from the dielectric fluid circulates,
    wherein the cooling device further comprises at least one inclined face for heat exchange between the dielectric fluid and the heat transfer fluid, the at least one inclined face being arranged inclined relative to a horizontal direction when the system is mounted on the motor vehicle, and
    wherein inclination of the at least one inclined face enables passage of gases from a bottom side of the at least one inclined face that is toward a bottom side of the cooling device to a top side of the at least one inclined fact that is toward a top side of the cooling device.

2. The system as claimed in claim 1, in which the compartment that receives the battery or battery cells includes at least one side wall and wherein the heat exchange face forms an angle other than 90° with the at least one side wall.

3. The system as claimed in claim 1, wherein the compartment that receives the battery or battery cells includes at least a bottom and wherein the heat exchange face forms an angle of between 5° and 45° with the bottom.

4. The system as claimed in claim 1, wherein the cooling device includes a plurality of separate inclined faces that are parallel to each other.

5. The system as claimed in claim 4, in which there is a free space between the separate inclined faces.

6. The system as claimed in claim 1, wherein the at least one inclined face is arranged above the battery cells so that condensed liquid on the inclined face falls by gravity onto the battery cells.

7. The system as claimed in claim 4, wherein the inclined faces are arranged in two groups, each group being defined by a different inclination from the other group.

8. The system as claimed in claim 1, wherein the at least one inclined face is formed on a plate that defines a heat transfer fluid circuit.

9. The system as claimed in claim 8, in which the plates are spaced apart from each other, and symmetrical relative to a plane of symmetry.

10. The system as claimed in claim 8, wherein an inlet or inlets of the plate are situated substantially in the center of the battery or the battery cells.

11. An apparatus for cooling at least one motor vehicle battery of a motor vehicle, the apparatus comprising:
    a closed compartment arranged to receive a battery or battery cells;
    a dielectric fluid present in the compartment configured to cool the battery or battery cells by evaporating when the battery or battery cells heat up, wherein the battery or battery cells are immersed in the dielectric fluid;
    a cooling device arranged to cool the dielectric fluid comprising:
        at least one channel in which a heat transfer fluid separate from the dielectric fluid circulates, and
        at least one inclined face for heat exchange between the dielectric fluid and the heat transfer fluid, the at least one inclined face being arranged above the battery or battery cells at level with a cover of the battery or battery cells,
    wherein the at least one inclined face facilities gravity flow of drops of the dielectric fluid, and
    wherein inclination of the at least one inclined face enables passage of gases from a bottom side of the at least one inclined face that is toward a bottom side of the cooling device to a top side of the at least one inclined fact that is toward a top side of the cooling device.

* * * * *